Dec. 28, 1943.　　J. B. McWILLIAMS　　2,337,760
TRACK JOINT LUBRICATION
Filed April 7, 1942
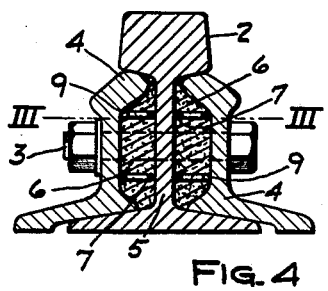
FIG. 2
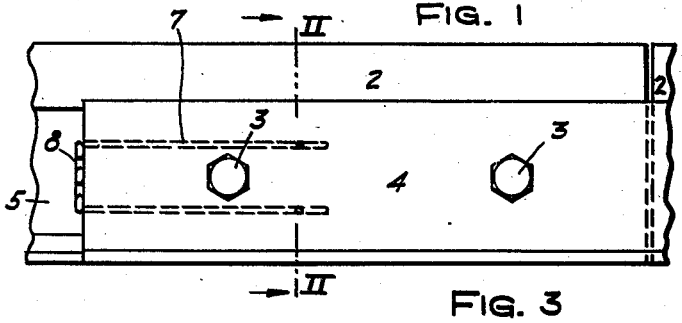
FIG. 1
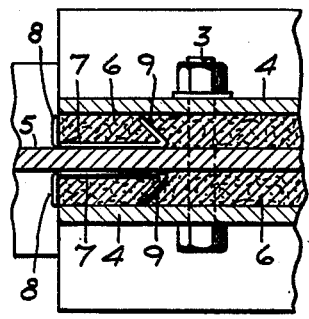
FIG. 4
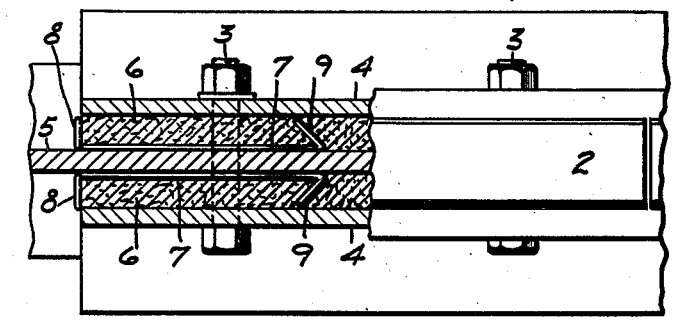
FIG. 3
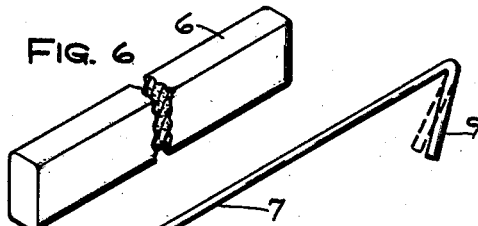
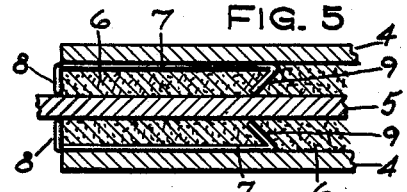
FIG. 5
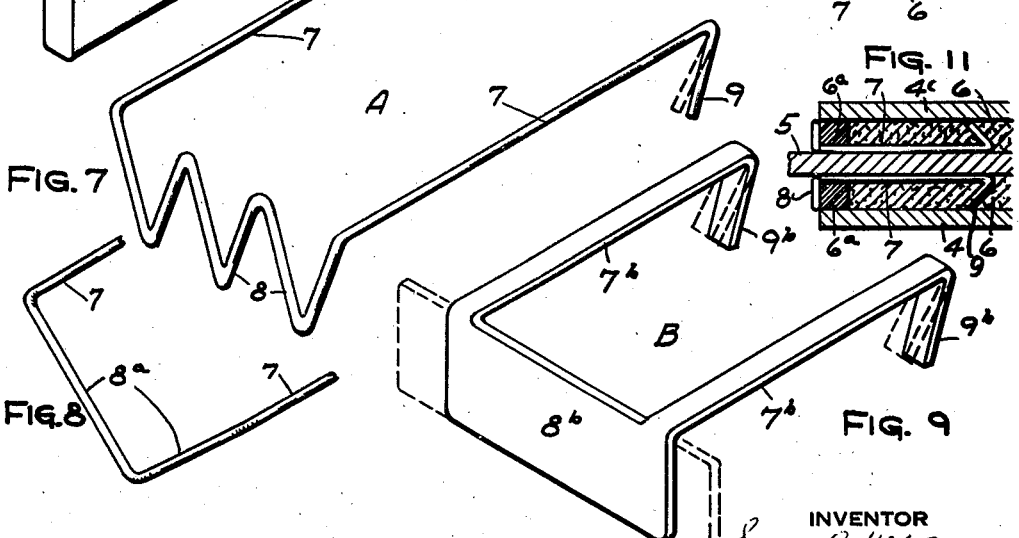
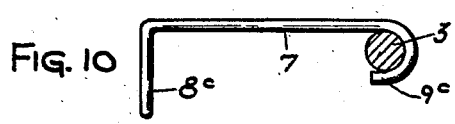
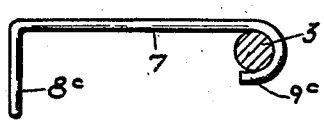
INVENTOR
James B. McWilliams
BY
C. M. Clarke
ATTORNEY Patented Dec. 28, 1943

2,337,760

UNITED STATES PATENT OFFICE 2,337,760

TRACK JOINT LUBRICATION

James B. McWilliams, Pittsburgh, Pa., assignor to Railway Maintenance Corporation, Pittsburgh, Pa., a corporation of Pennsylvania Application April 7, 1942, Serial No. 437,982

20 Claims. (Cl. 238—244)

My invention is an improvement in railway track joints of that class in which lubricant is interposed between the connected rail ends and the fish plates or joint bars, and to means for retaining the lubricant in position.

In modern practice, the lubricant, composed of a plastic or semi plastic filler of suitable material, is impregnated with one or more kinds of lubricating oils and prepared in block or cake form, for insertion as a unit or units in position. Subject to compression by the fish plates at each side the lubricant completely fills all spaces and interstices between the plates and the webs of the abutting rails, as well as around the bolts and their threads, while also effectively preventing rust, wear, freezing of the nuts, or other metal faces.

Due to the severe strains and vibration of railway track service, one of the difficulties heretofore experienced in such practice is to maintain the lubricant in position without loss or separation, especially where used in block or cake form. Frequently there is a tendency effecting transverse severance of the mass coincident with weakening of the lubricating body across the bolt hole zones, and especially at the outermost portions, with resulting loss.

In the practice of my invention I have secured excellent results by introducing between the rail webs and the fish plates, a unitary pre-formed body of rail joint plastic made from a gum asphalt base oil containing distillate to penetrate scale, and an added percentage of lubricating oil, with finely divided white pine wood flour, as a filler. The invention however is not so limited, and may be utilized in all cases where the lubricant, of whatever composition, is susceptible of being retained in position, as herein presented.

In the drawing showing preferred embodiments of the invention:

Fig. 1 is a partial view in side elevation of a rail joint provided with my lubricant retaining members.

Fig. 2 is a transverse section on the line II—II of Fig. 1.

Fig. 3 is a plan view of Fig. 1 partly in section, on the line III—III of Fig. 2.

Fig. 4 is a partial similar view showing a shorter form of the retaining members.

Fig. 5 is a partial sectional view like Fig. 3 showing a reversed arrangement of the retaining members.

Fig. 6 is an isometric view, partly broken away, of the lubricating unit or cake.

Fig. 7 is an isometric view of one of the retaining members as made of wire.

Fig. 8 is a partial similar view showing a modified form, as to the outer end.

Fig. 9 is a similar view showing a modified form thereof.

Fig. 10 is a detail view showing an inner hooked terminal engaging the bolt.

Fig. 11 is a further detail construction illustrating use of separable closing plugs.

As in usual practice, the rails 2, 2, are connected by transverse bolts 3 extending through plural holes in the fish plates 4 and the web 5 of the rails.

The space between the fish plates and the webs of adjacent rails is occupied by an oil-impregnated packing of fibrous, granular, or other suitable material, which will retain the oil for a comparatively long period of time, as the composition noted above, or any good equivalent. Due to the relative limited movement of the joint members themselves and of the confined lubricant, by the passage of the car wheels, the confined mass will exude oil into the various crevices and around the bolts and their threads or other parts of the entire rail joint, to keep the parts lubricated, under the strains and by any slight relative movement of the parts.

In preparing the lubricant impregnated packing for application, as by first placing it along throughout the inner channel of each fish bar prior to connection in making the joint, such plastic mass 6 is shaped as a unit to approximately correspond dimensionally thereto and fit therein, as in Fig. 6.

When so located, the inward oppositely acting pressure of plates 4, 4, will tend to deform the unit, distributing the lubricant and filling any vacancies as stated. Prior to final tightening of the plates, or even thereafter, depending on the density of the substance 6, the retaining devices A or B are inserted, as in Figs. 1 to 4, at each opposite end.

One such form, as in Fig. 7, is made of wire, bent as shown, to provide a pair of straight parallel shank or leg portions 7, a series of outer alternate loops 8, in approximate flange arrangement, are disposed at right angles thereto, the opposite inner resilient ends of the shanks being hook shaped inwardly, as at 9.

These may be forcibly pressed inwardly through the lubricating units, at opposite ends thereof, until the loops 8 are against the ends of each unit, approximating the plane of the fish plate ends.

Alternatively, the retainers may be pressed laterally into the plastic units prior to their placement in the fish plates, or may be originally thus combined with the units as they are made, with the retainers already imbedded, ready for placement in the inner channels of the plates.

The shanks 7 are spaced apart sufficiently far to straddle the bolts with ample clearance, as in Fig. 2, and to extend beyond them, as shown. Otherwise, if desired, the hooks may terminate outwardly beyond the bolts, in reduced lengths, as in Fig. 4.

While in so locating the device A, the free ends extend laterally outwardly as shown, or the reverse, as in Fig. 5, I prefer the arrangement of Fig. 3 as shown. With either, it will be noted, that the straight shanks 7, or their terminal bends, will bear against a resisting face, as that of the rail web, and the terminals of resilient hooks 9 will bear against an opposite resisting face, as that of the fish plate, or vice versa, as preferred.

Due to the shape of such hooked terminals, they provide by their acute angle bends, entering points which in effect assist entrance in forcing the retaining devices inwardly through the lubricant units 6, when so applied. Normally, before insertion, the hooks extend somewhat beyond the final clearance space between the web and the plates, and upon entering will be resiliently deflected, more or less, as indicated in dotted lines, Figs. 7 and 9. As a result, when in final position, these resilient terminals will engage the opposing wall faces with quite sufficient force and resulting frictional engagement to firmly hold the end loops 8 against the end portions of the units, preventing removal thereof or loss, if the units become severed or weakened anywhere between their ends.

It will be observed that the loops 8 constitute and provide in effect a flange-like retaining end, opposing any outward movement or loss of any fragmentary portion of the lubricant.

The device may also be of any other suitable construction, for instance of thin sheet or plate metal, as in Fig. 9, made from an integral stamped blank. In such case, as in either form, the shanks 7b of desired length, flange 8b, and hooks 9b conform generally to the proportions, spacing, dimensions, etc. of the particular rail joint parts with which they are to be used, and operate in substantially the manner described as to form A.

The flange 8b may be co-extensive with the width of the shanks 7b, or somewhat wider, as indicated in dotted lines.

With either form the terminal hooks may be bent inwardly or outwardly to conform to various splice templates to have the necessary spring tension between inside faces of the joint or splice bars and of the web of the rail.

I show also in Fig. 8 a modified construction in which the wire is bent at the outer end in simpler form, extending in V form from the shank terminals, across the endmost unit area, as at 8a, practically covering and retaining the unit in the manner of a dam or abutment.

Also, as in Fig. 10, one or both shanks 7, having either form of outer retaining construction as at 8c, is/are provided with an inner hook terminal or terminals 9c for holding connection with the outer fish plate and rail connecting bolt 3. In using such construction the retainer is to be imbedded initially in the unit and placed in position in the opposite fish plates, with the hook opening in register with the bolt holes of both and of the rail web. Thereafter the joint is completed by insertion and tightening of the bolts, as usual.

In application, the splice bars may be placed in embracing position with the contained lubricating units, which are sufficiently plastic to permit driving the bolts through them in register with the bolt holes of the bars, for tightening.

Any extruded lubricating material at either end of the splice, when tightened, should be pressed back. The retainers, unless already incorporated with the units, are then inserted to their full length, with their shanks or legs preferably against the rail web, and the hooks turned outwardly to contact against inside faces of the bars.

It will also be understood that the retainer, in shortened lengths, may be also used in connection with terminal packing plugs or short section units, forming closing dams, in connection either with or without any other intermediate lubricant, if desired.

Thus I show in Fig. 11 endmost plugs 6a held by similar retainers 7 in position, closing the interior lubricant spaces, and contained lubricant 6, if present, against movement or endwise escape.

The plugs 6a are equally useful as terminal closures, whether used in connection with packing 6 or not. The plugs, of plastic or other suitable material, are especially useful in all cases to effect exclusion of any foreign matter from the interior joint area.

The construction and manner of use of the invention will be readily understood by the skilled mechanic or those familiar with railroad construction. The retainer may be changed or varied in construction, design, details, etc., as by the modifications illustrated, or otherwise, within the scope of the following claims.

What I claim is:

1. A lubricant retainer for rail joints consisting of a shank member having an outer flange-like lubricant-impregnated-packing retaining portion and an inner terminal hook engageable by contact with the inner face of an element of the rail joint construction.

2. A lubricant retainer for rail joints consisting of a shank member having an outer flange-like lubricant-impregnated-packing retaining portion and an inner backwardly reversed resilient terminal engageable by contact with the inner face of an element of the rail joint construction.

3. A lubricant retainer for rail joints consisting of a shank member having an outer laterally extending lubricant-impregnated-packing retaining portion and an inner hook terminal engageable by contact with an inner element of the rail joint construction.

4. A lubricant retainer for rail joints consisting of a shank member insertible through the lubricant having an inner resilient hook terminal engageable with an inner rail joint element and an outer lubricant-impregnated-packing retaining portion extending laterally from the shank.

5. A lubricant retainer for rail joints consisting of a shank member insertible through the lubricant having an inner backwardly reversed resilient hook terminal engageable with an inner rail joint element and an outer lubricant-impregnated-packing retaining portion extending laterally from the shank.

6. A lubricant retainer for rail joints consisting of a shank member insertible through the lubricant having an inner resilient hook terminal and an outer integral laterally extending lubricant-impregnated-packing retaining portion, said hook terminal having reacting holding engagement against an inner rail joint element.

7. A lubricant retainer for rail joints consisting of a pair of spaced apart shank members each having an inner deflected resilient hook terminal subject to deflection by and reaction against an inner rail joint member, and an outer angularly disposed lubricant-impregnated-packing retaining portion.

8. A lubricant retainer for rail joints consisting of a pair of spaced apart shank members each having an inner deflected resilient hook terminal subject to deflection by and reaction against an inner rail joint member, and an outer angularly disposed integral lubricant-impregnated-packing retaining portion.

9. A lubricant retainer for rail joints consisting of a continuous wire construction bent to provide a pair of spaced apart shank members each having a deflected resilient inner terminal and an outer series of laterally disposed connecting lubricant-impregnated-packing retaining loops disposed between the shank members and at an angle thereto.

10. A lubricant-impregnated-packing retaining device for rail joints consisting of a continuous metallic construction having an outer retaining abutment portion and a pair of spaced apart leg members extending at right angles thereto and provided with inwardly disposed resilient bearing portions.

11. In a railway track joint, the combination with a pair of abutting rails, fish plates extending along each side of each rail adjacent their ends, a lubricating packing between the fish plates and the rails, means holding the fish plates and rails together, and retaining means extending bodily through the packing having an outer limiting abutment therefor and an inwardly extending portion having a resilient terminal hook in holding engagement with one of the packing-engaging and confining elements of the rail joint.

12. In a railway track joint, the combination with a pair of abutting rails, fish plates extending along each side of each rail adjacent their ends, a lubricating packing between the fish plates and the rails, means holding the fish plates and rails together, and retaining means having an outer limiting transverse abutment for the packing and an inwardly extending portion provided at its inner end with a resilient hook terminal having holding engagement with the inner face of one of the packing-engaging and confining elements of the rail joint.

13. In a railway track joint, the combination with a pair of abutting rails, fish plates extending along each side of each rail adjacent their ends, a lubricating packing between the fish plates and the rails, means holding the fish plates and rails together, and retaining means having an outer limiting transverse abutment for the packing and an inwardly extending portion provided with a resilient hook having holding engagement with the inner faces of the fish plate and rail web respectively.

14. In a railway track joint, the combination with a pair of abutting rails, fish plates extending along each side of each rail adjacent their ends, a lubricating packing between the fish plates and the rails, means holding the fish plates and rails together, and retaining means including a portion insertible bodily through the packing having an outer limiting transverse abutment for the packing and inwardly extending portion provided with a resilient hook having holding engagement with the inner faces of the fish plate and rail web respectively.

15. In a railway track joint, the combination with a pair of abutting rails, fish plates extending along each side of each rail adjacent their ends, a lubricating packing between the fish plates and the rails, bolts holding the fish plates and rails together, and a retaining device for the packing having an outer flange-like limiting abutment and a pair of inwardly extending shanks extending through the packing provided with reversely bent resilient terminals providing by said terminals with the shanks holding engagement with the inner opposing face of one of said track joint members.

16. In a railway track joint, the combination with a pair of abutting rails, fish plates extending along each side of each rail adjacent their ends, a lubricant-impregnated packing between the fish plates and the rails, bolts holding the fish plates and rails together, and a retaining device for the packing extending therethrough having an outer flange-like limiting abutment for the packing and an inwardly extending shank provided with a terminal hook in holding engagement with an element of the rail joint construction.

17. In a railway track joint, the combination with the rail ends and embracing fish plates therefor enclosing an intervening lubricant-impregnated-packing, endmost separable confining and closing plugs having means incorporated therewith extending inwardly through the lubricant packing for resisting outward movement thereof.

18. In a railway track joint, the combination with the rail ends and embracing fish plates therefor enclosing an intervening lubricant-impregnated-packing, endmost separable confining and closing plugs having means incorporated therewith extending inwardly through the lubricant packing engageable with inner face portions of the track joint construction for resisting outward movement thereof.

19. In a railway track joint, the combination with the rail ends and embracing fish plates therefor enclosing an intervening lubricant-impregnated-packing, endmost separable confining and closing plugs each having a retaining device extending inwardly through the lubricant packing as described engageable with an inner element of the track joint construction for resisting outward movement of said plugs.

20. In a railway track joint, the combination with the rail ends and embracing fish plates therefor enclosing an intervening lubricant-impregnated-packing, endmost separable closing plugs each having a retaining device extending through the packing engageable with the inner portion of an element of the track joint construction for resisting outward movement of said plugs.

JAMES B. McWILLIAMS.